(12) United States Patent
Costle et al.

(10) Patent No.: US 10,611,105 B2
(45) Date of Patent: Apr. 7, 2020

(54) AEROSOL DISPENSING CAP FOR AUTOMATED INSTALLATION

(71) Applicant: ILLINOIS TOOL WORKS INC., Glenview, IL (US)

(72) Inventors: Carey Christopher Costle, Tucson, AZ (US); Stephen Edward Richey, Atascadero, CA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 56 days.

(21) Appl. No.: 15/894,305

(22) Filed: Feb. 12, 2018

(65) Prior Publication Data

US 2018/0229456 A1    Aug. 16, 2018

Related U.S. Application Data

(60) Provisional application No. 62/457,271, filed on Feb. 10, 2017.

(51) Int. Cl.
*B60C 29/06*    (2006.01)
*B65D 83/20*    (2006.01)
(Continued)

(52) U.S. Cl.
CPC .......... *B29C 73/166* (2013.01); *B29C 73/025* (2013.01); *B60C 29/06* (2013.01); *B60C 29/064* (2013.01); *B60C 29/066* (2013.01); *B60S 5/043* (2013.01); *B65D 83/205* (2013.01); *B65D 83/24* (2013.01); *B65D 83/303* (2013.01); *B65D 83/756* (2013.01); *F16K 35/025* (2013.01); *F16K 35/027* (2013.01); *B29L 2030/00* (2013.01); *B60C 29/062* (2013.01); *Y10T 137/3584* (2015.04); *Y10T 137/374* (2015.04); *Y10T 137/3755* (2015.04); *Y10T 137/3771* (2015.04); *Y10T 137/7069* (2015.04); *Y10T 137/7225* (2015.04)

(58) Field of Classification Search
CPC ..... B29C 73/025; B29C 73/166; B60S 5/043; B60C 29/06; B60C 29/062; B60C 29/064; B60C 29/066; B65D 83/205; B65D 83/24; B65D 83/303; B65D 83/756; Y10T 137/3584; Y10T 137/374; Y10T 137/3755; Y10T 137/3771; Y10T 137/7069; Y10T 137/7225; F16K 35/025; F16K 35/027
USPC ............ 141/38, 279, 326, 383; 222/153.12; 251/111, 113, 114
See application file for complete search history.

(56) References Cited

U.S. PATENT DOCUMENTS 549,603 A * 11/1895 Jeffery .................... B60C 29/02
                                                              152/427
906,158 A * 12/1908 Raymond ............... F16K 15/20
                                                              137/233

(Continued)

*Primary Examiner* — Matthew W Jellett
(74) *Attorney, Agent, or Firm* — Pauley Erickson & Kottis

(57) ABSTRACT

An apparatus for dispensing pressurized air and/or tire sealant from a pressurized can. The apparatus comprising a nozzle and a locking element for the nozzle and/or a cap including a free length of hose that is positioned within the cap. The locking element locks the nozzle in the non-dispensing position for safety during non-use or in a dispensing position for ease of use. The hose provides an extension for the nozzle for hard to reach places, and stores fully wound within the cap, such as along the inner circumference of the cap.

14 Claims, 7 Drawing Sheets

(51) Int. Cl.
*B29C 73/16* (2006.01)
*B60S 5/04* (2006.01)
*B29C 73/02* (2006.01)
*B65D 83/14* (2006.01)
*B65D 83/30* (2006.01)
*B65D 83/24* (2006.01)
*F16K 35/02* (2006.01)
*B29L 30/00* (2006.01)

(56) References Cited

U.S. PATENT DOCUMENTS

| | | | |
|---|---|---|---|
| 1,492,838 A * | 5/1924 | Dilweg | B60C 29/064 |
| | | | 152/415 |
| 4,276,898 A * | 7/1981 | Ross | B29C 73/166 |
| | | | 137/231 |
| 5,282,551 A * | 2/1994 | Pierson | B65D 83/205 |
| | | | 222/153.11 |
| 5,305,784 A * | 4/1994 | Carter | B60C 29/064 |
| | | | 137/223 |
| 5,517,732 A * | 5/1996 | Crear | B67D 7/50 |
| | | | 141/392 |
| 6,260,739 B1 | 7/2001 | Hsiao | |
| 6,382,469 B1 | 5/2002 | Carter et al. | |
| 6,431,225 B1 * | 8/2002 | Dudley | B29C 73/166 |
| | | | 141/38 |
| 6,708,849 B1 * | 3/2004 | Carter | B65D 83/20 |
| | | | 222/153.1 |
| 7,028,720 B2 | 4/2006 | Eckhardt | |
| 7,487,891 B2 | 2/2009 | Yerby et al. | |
| 7,694,698 B2 | 4/2010 | Marini | |
| 7,757,905 B2 | 7/2010 | Strand et al. | |
| 7,854,242 B2 | 12/2010 | Stehle | |
| 8,087,552 B2 | 1/2012 | Fazekas et al. | |
| 8,100,298 B2 | 1/2012 | Marquardt et al. | |
| 8,127,968 B2 | 3/2012 | Yerby et al. | |
| 8,205,645 B2 | 6/2012 | Dowel | |
| 8,360,119 B2 | 1/2013 | Huang et al. | |
| 8,453,684 B2 | 6/2013 | Lolli | |
| 8,517,227 B2 | 8/2013 | Strand et al. | |
| 8,627,857 B2 | 1/2014 | Chou | |
| 8,640,745 B2 | 2/2014 | Ji | |
| 9,050,866 B2 | 6/2015 | Hong | |
| 9,193,229 B2 | 11/2015 | Hong | |
| 9,227,600 B2 | 1/2016 | Chen | |
| 9,242,416 B1 | 1/2016 | Ohm et al. | |
| 9,457,367 B2 | 10/2016 | Wang | |
| 9,492,976 B2 * | 11/2016 | Hong | B29C 73/166 |
| 10,030,800 B2 * | 7/2018 | Wang | B60C 29/064 |
| D830,507 S * | 10/2018 | Kanenari | D23/225 |
| 2003/0001124 A1 * | 1/2003 | Chen | F16K 35/025 |
| | | | 251/113 |
| 2013/0255790 A1 * | 10/2013 | Cherry, Sr. | F16K 15/20 |
| | | | 137/12 |
| 2015/0233485 A1 * | 8/2015 | Cheng | F16K 15/20 |
| | | | 137/223 |

* cited by examiner

AEROSOL DISPENSING CAP FOR AUTOMATED INSTALLATION

CROSS REFERENCE TO RELATED APPLICATION

This application claims the benefit of U.S. Provisional Application Ser. No. 62/457,271, filed on 10 Feb. 2017. The parent application is hereby incorporated by reference herein in its entirety and is made a part hereof, including but not limited to those portions which specifically appear hereinafter.

BACKGROUND OF THE INVENTION

Field of the Invention

The invention relates to a device for dispensing air and/or tire sealant from a canister by means of a pressure source, such as a dispensing topper for a pressurized can.

Description of Prior Art

Tire repair devices are primarily used for introducing air and/or tire sealant into defective tires when a flat tire occurs and for sealing a defective tire. Current devices include cans of pressurized air and/or sealant with a can topper adapted to connect to a tire stem and inject the can contents into the flat tire.

SUMMARY OF THE INVENTION

The present invention provides an apparatus for the top of a pressurized can, including a nozzle for releasing the can contents. The apparatus of this invention includes a nozzle assembly that goes on the can top and a removable upper cap that goes over the nozzle assembly when not in use. The apparatus of this invention includes an integrated nozzle/valve locking element for locking the nozzle in a closed or open position, and/or an upper cap with a retaining system for an optional hose that is not connected to the nozzle/valve.

The invention includes an apparatus for dispensing pressurized air and/or tire sealant from a pressurized can, wherein the apparatus includes a base configured to attach to the pressurized can. A nozzle extends from the base and has an end including a nozzle fitting configured to attach to a stem valve. A cap is removably attachable over the base and nozzle. The cap includes a cap side wall and a cap top at an end of the cap side wall opposite the base. The apparatus includes a hose with a first end that is connectable to the nozzle fitting and an opposite second end including a hose fitting configured to attach to the stem valve. For storage or otherwise during non-use, the hose is positioned and held within the cap with the first end detached from the nozzle fitting. In embodiments of this invention, the cap includes clips or other fasteners extending from the cap top to secure the hose in a ring position against the cap side wall.

The invention further includes an apparatus for dispensing pressurized air and/or tire sealant from a pressurized can, wherein the apparatus includes a nozzle extending from a base and a locking mechanism or element configured to lock the nozzle in at least one of two positions. The locking mechanism can be used to lock the nozzle in a dispensing position during use, and/or a non-dispensing position during non-use. In embodiments of this invention, the locking mechanism includes a locking element on the base and two locking components on the nozzle, such as two locking tabs extending outward from the nozzle. The locking element can be moved into a position with respect to each tab, whereby the placement of one tab keeps the nozzle closed, and the other tab locks the nozzle in the open, dispensing position.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

FIGS. 1-4 show a dispenser apparatus 20 for placement on a dispensing end of a pressurized can 22, such as over a can stem valve assembly. The pressurized can includes, without limitation, pressurized air and/or sealant material to be dispensed via the dispenser apparatus 20, such as into a low, flat or leaking tire.

Figure 1:
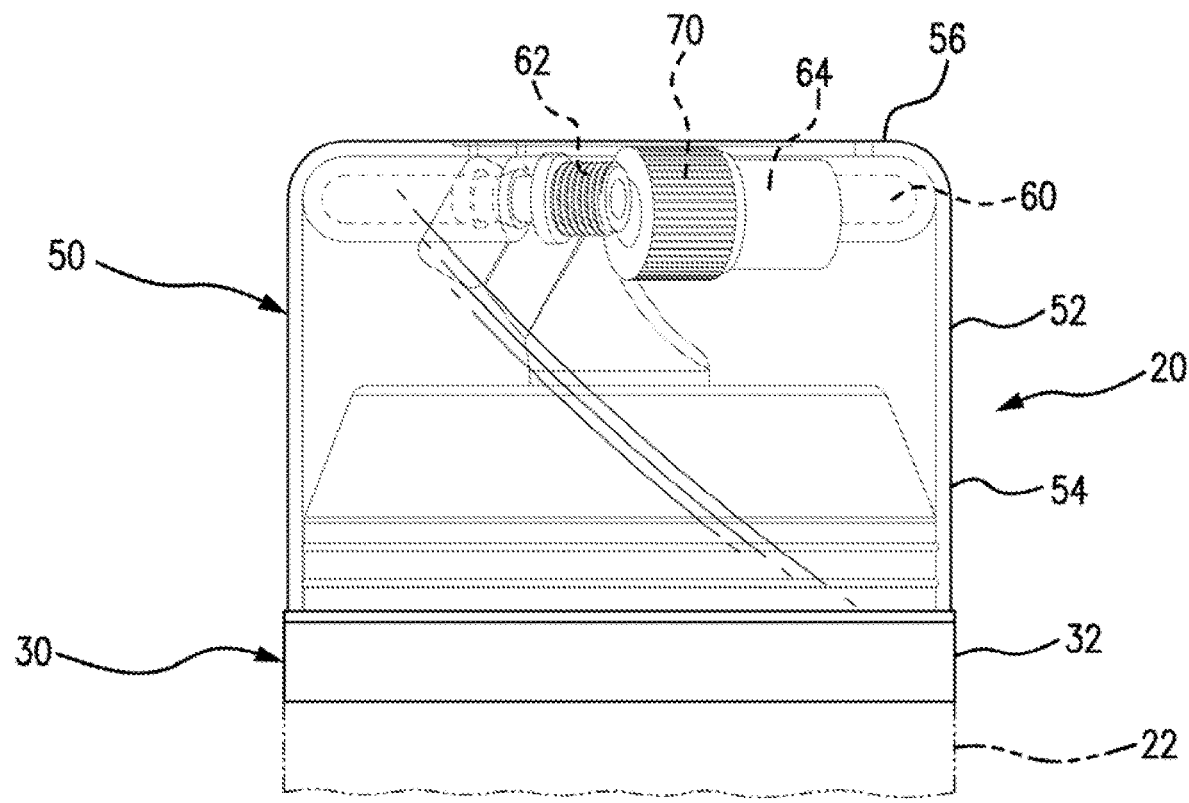
FIG. 1 is a side view of a dispensing apparatus for a tire repair device according to one preferred embodiment of this invention.
Figure 2:
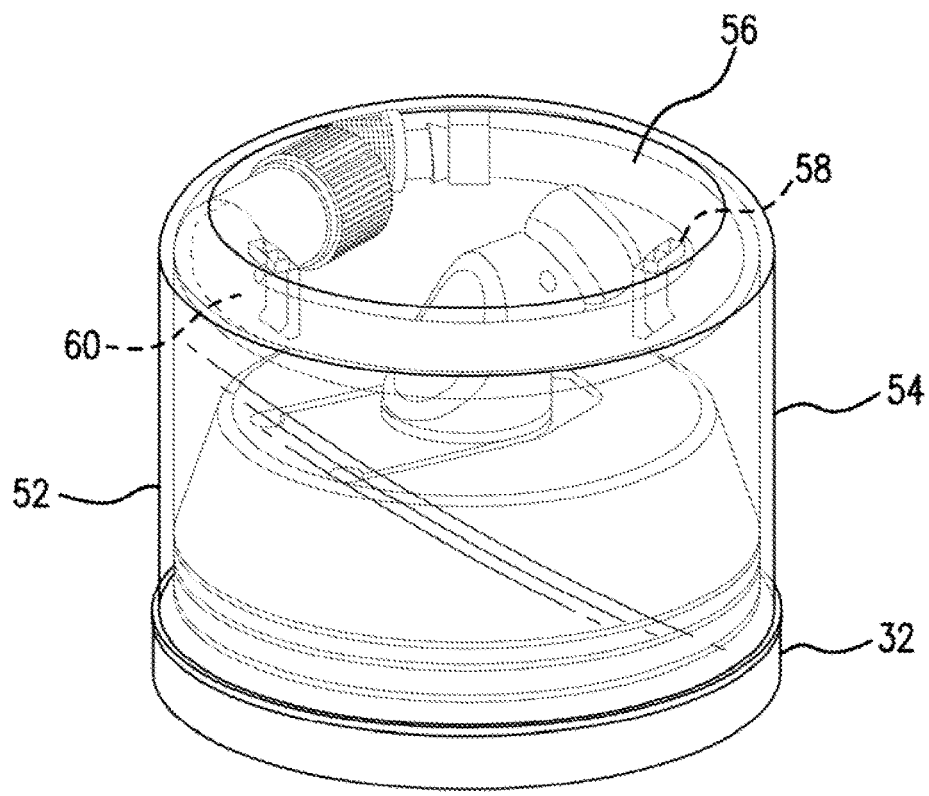
FIG. 2 is a perspective view of the apparatus of FIG. 1.
Figure 3:
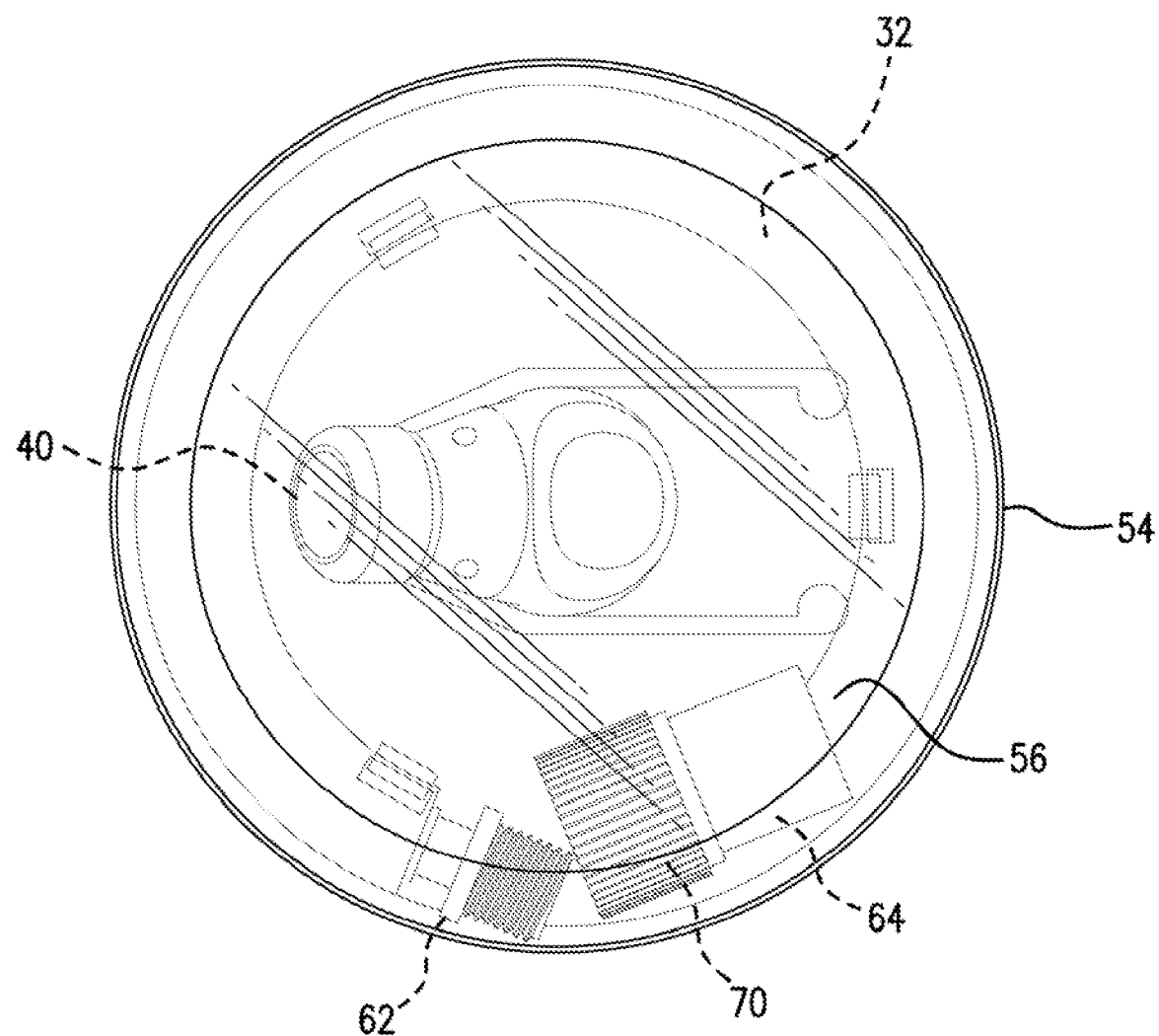
FIG. 3 is a top view of the apparatus of FIG. 1.
Figure 4:
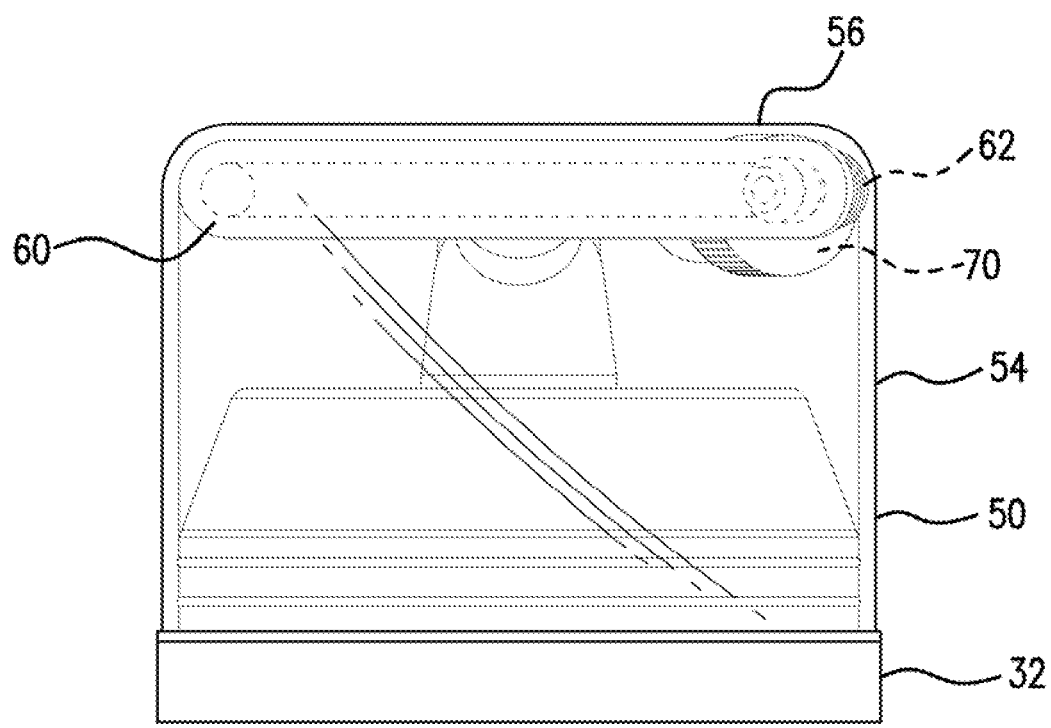
FIG. 4 is a second side view of the apparatus of FIG. 1.
Figure 5:
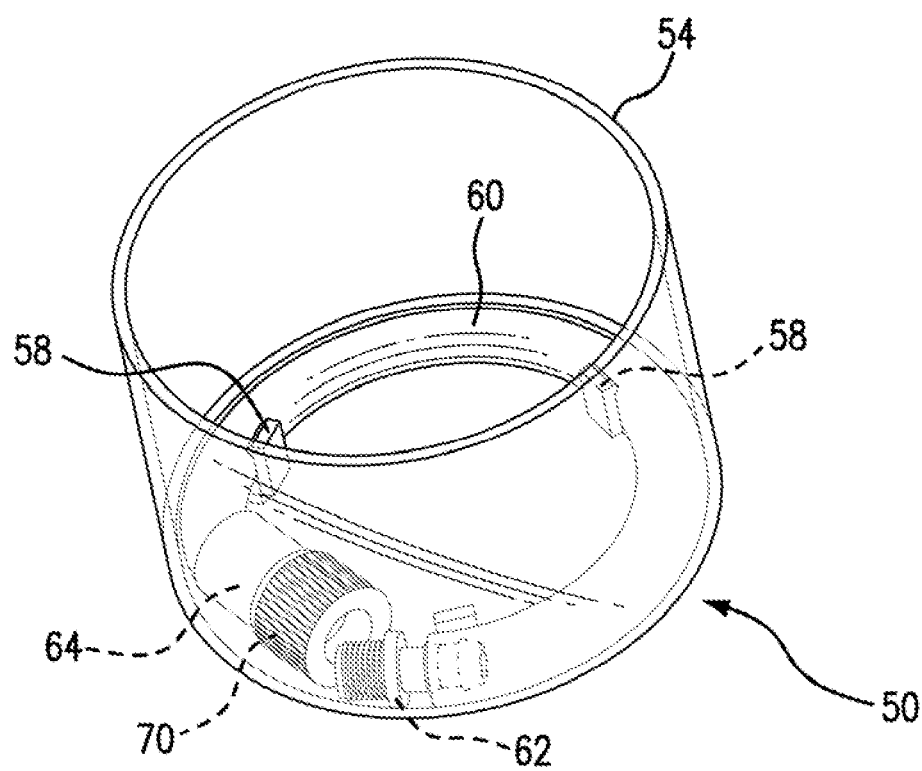
FIG. 5 is a perspective view of the apparatus cap from FIG. 1.
Figure 6:
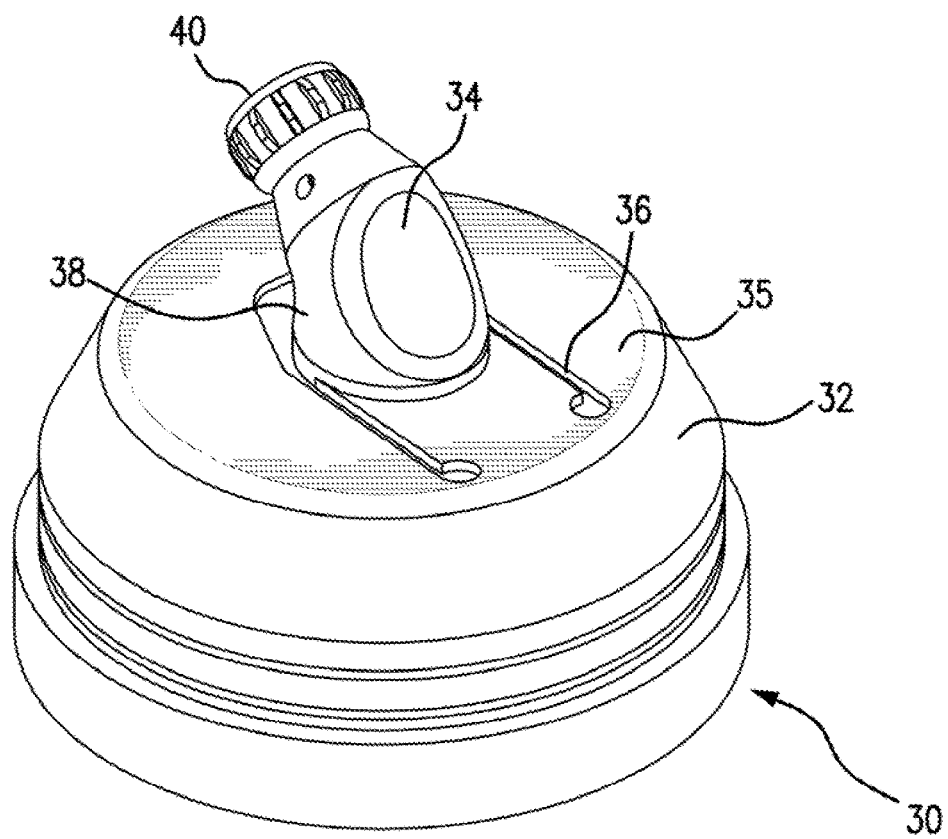
FIG. 6 is a top perspective view of the base of the apparatus from FIG. 1.
Figure 7:
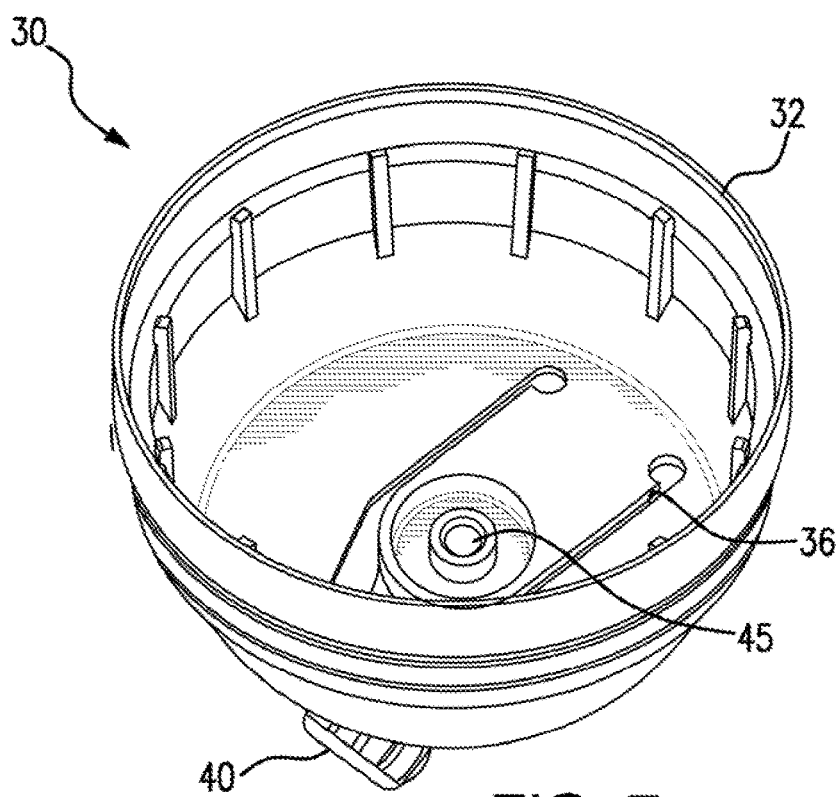
FIG. 7 is a bottom perspective view of the base of FIG. 6.
Figure 8:
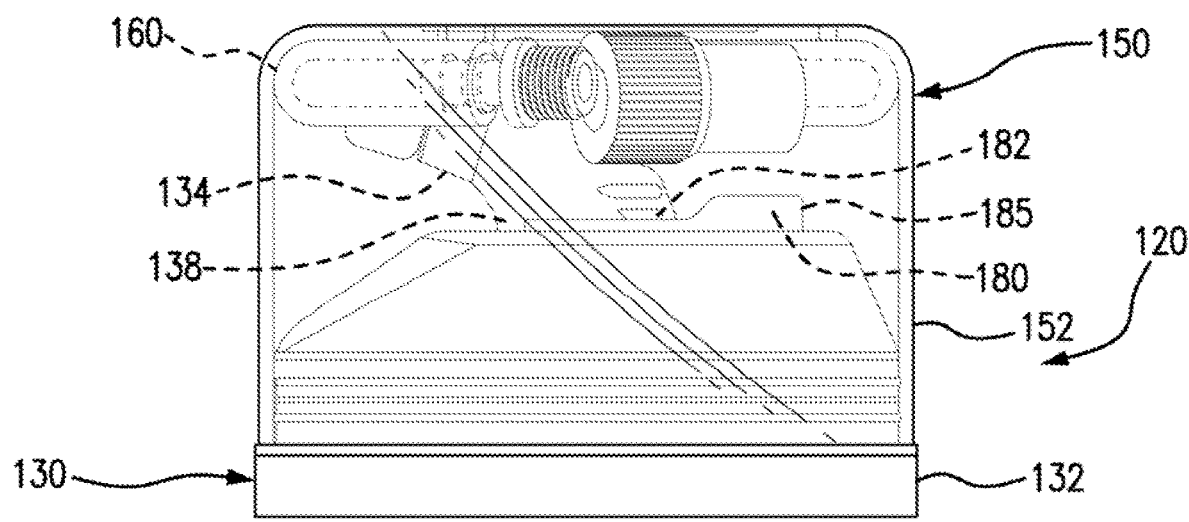
FIG. 8 is a side view of a dispensing apparatus for a tire repair device according to one preferred embodiment of this invention.
Figure 9:
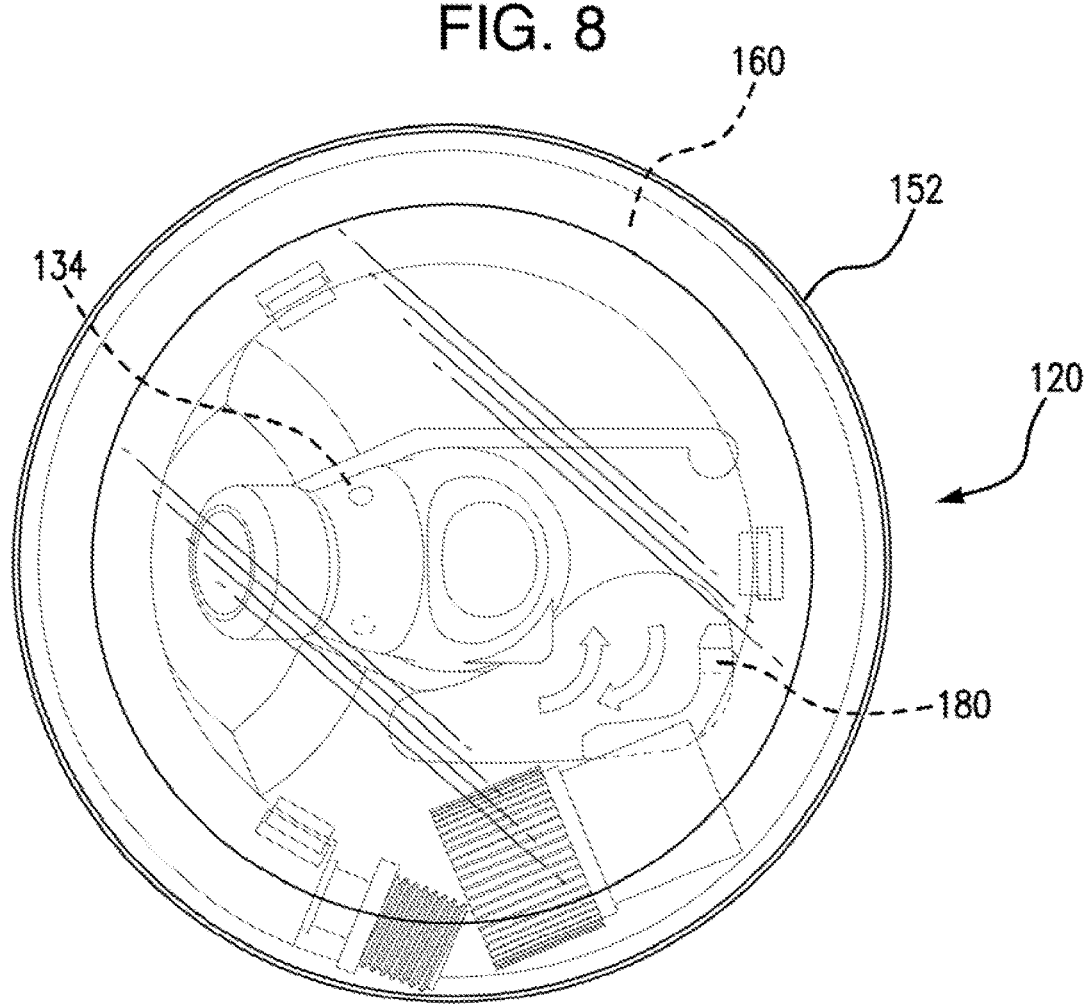
FIG. 9 is a top view of the apparatus of FIG. 8.
Figure 10:
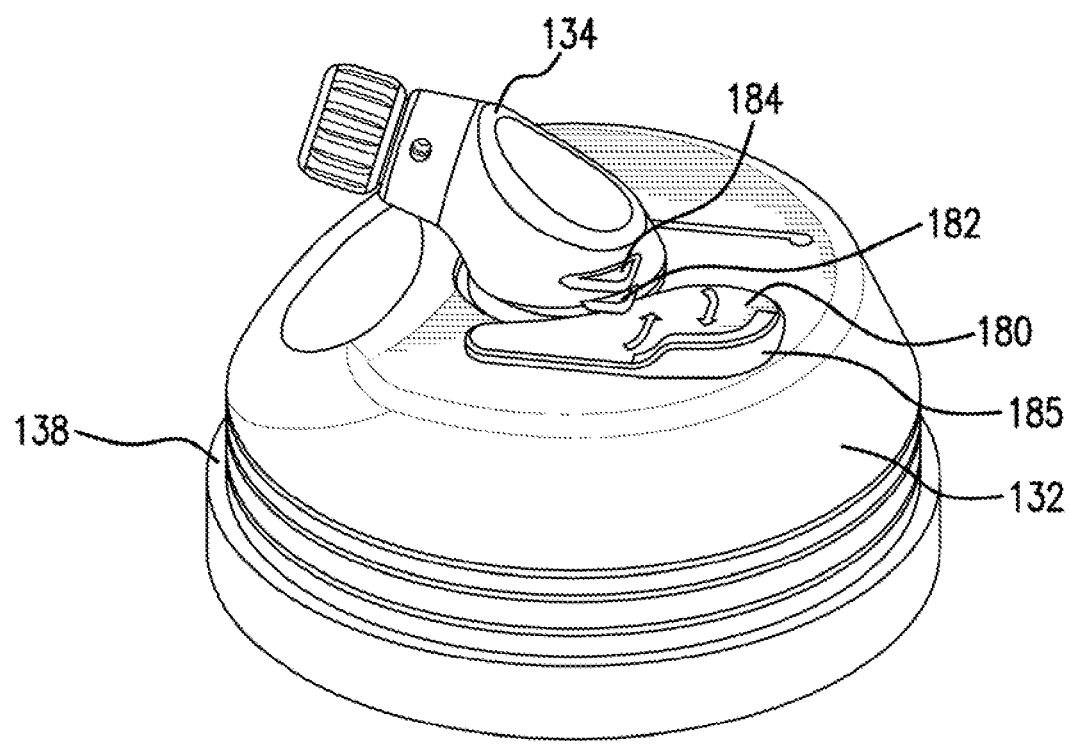
FIG. 10 is a perspective view of the base of the apparatus from FIG. 8.
Figure 11:
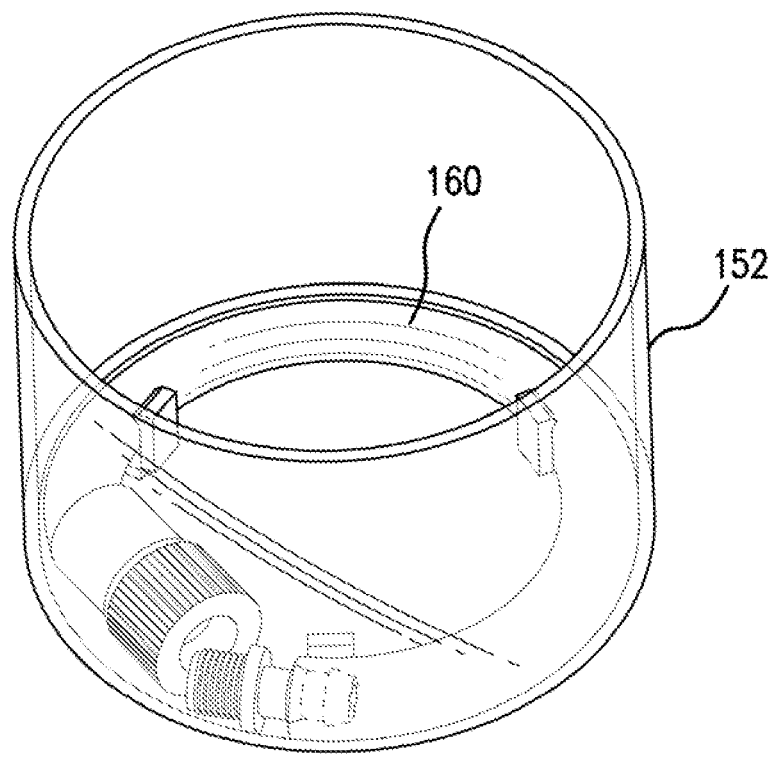
FIG. 11 is a perspective view of the apparatus cap from FIG. 8.
Figure 12:
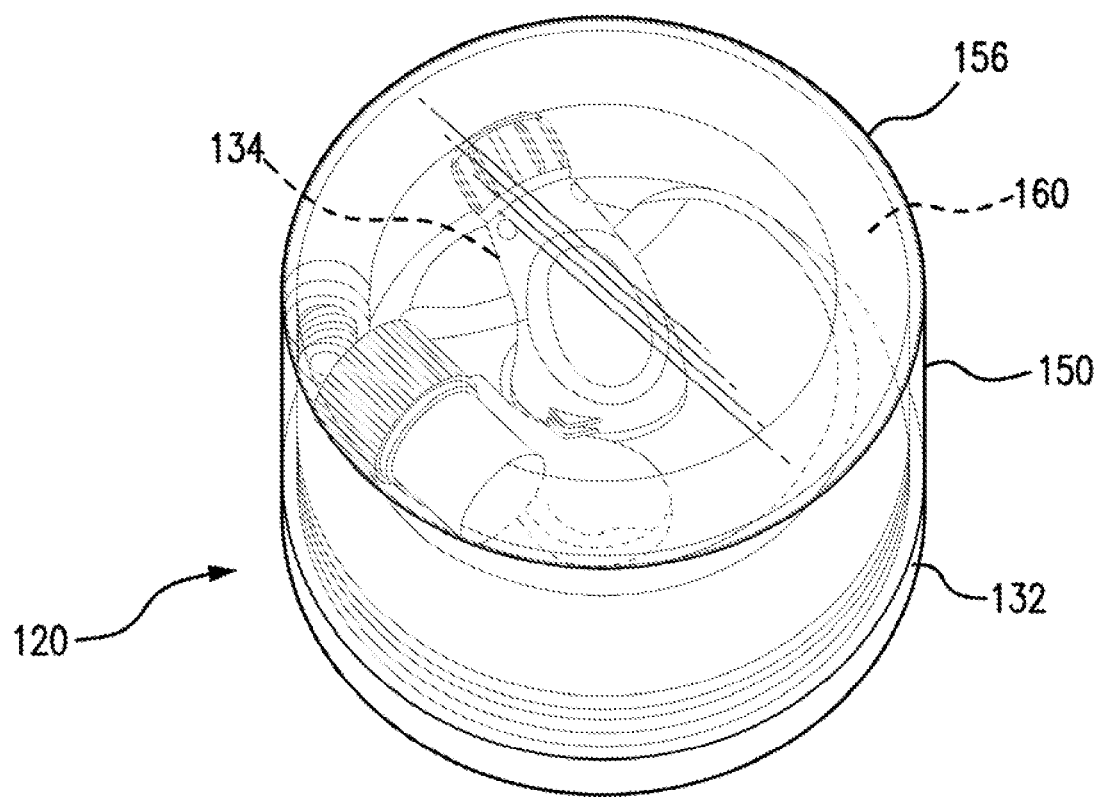
FIG. 12 is a sectional perspective view of the apparatus of FIG. 8.
Figure 13:
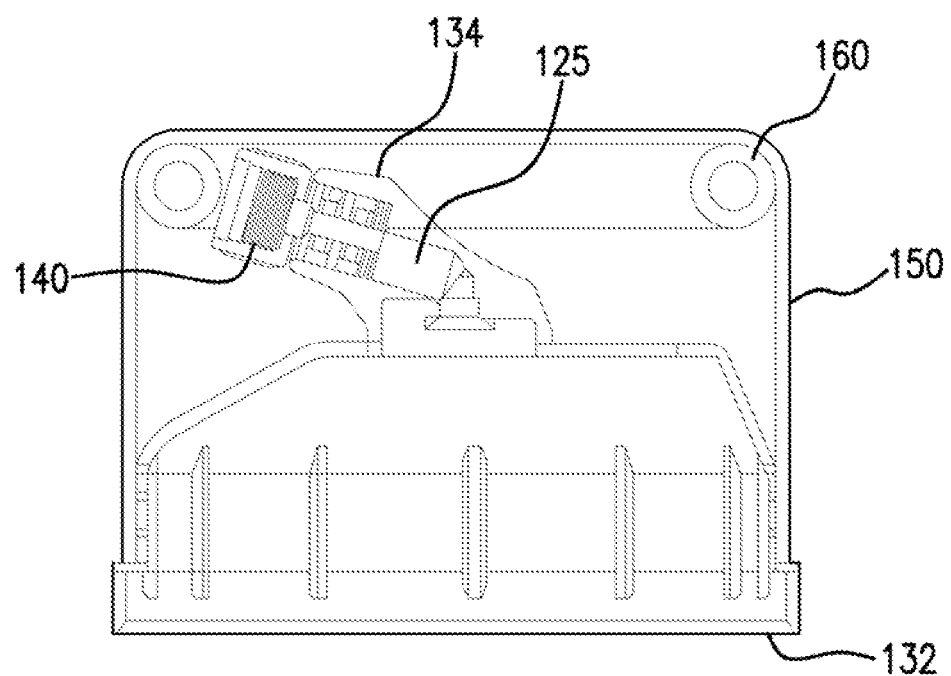
FIG. 13 is a sectional side view of the apparatus of FIG. 8.

The dispenser apparatus 20 includes a nozzle assembly 30 with a base 32 that fits over the dispensing end of the can 22. The nozzle assembly 30 includes a nozzle 34 extending from the base 32 and manually depressible to open the dispensing end of the can 22. FIGS. 6 and 7 show notches 36 in a top surface 35 of the base 32 and extending around the valve base 38 of the nozzle 34 to form a depressible tab that allow depression of the nozzle 34 to activate the can stem outlet below. In embodiments of this invention, the nozzle 34 is or includes an integrated valve (see valve 125 FIG. 13) that allows can contents to enter at opening 45 and pass through the nozzle 34. The nozzle 34 includes a nozzle fitting 40 at an end opposite the base and/or depressible tab, which includes the necessary size and connection elements (e.g., internal threads) for attachment to a stem valve. The base, nozzle and fitting, and components thereof, can vary in size, shape, amount, and/or configuration, depending on need.

The dispenser apparatus 20 includes a cap assembly 50 that fits over the nozzle assembly 30, such as to keep the nozzle 34 from unintentional activation during storage. The cap assembly 50 includes a cap 52 having a cylindrical side wall 54 that engages with the base 32 at an open end opposite a cap top 56, to keep the cap assembly 50 on the nozzle assembly 30.

The cap assembly 50 includes a free length of hose 60 useful for extending the nozzle fitting, and positioned for storage during non-use in a ring configuration around an inside of the cap 52. The free length of hose 60 includes a first end 62 that is detached from, but attachable such as by threading to, the nozzle fitting 40. The free length of hose 60 has an opposite second end 64 that includes a second fitting 70 with the necessary size and connection elements (e.g., internal threads) for attachment to a stem valve. In the ring configuration shown in FIGS. 1-5, the hose 60, and more particularly the first end 62, is not connected to the nozzle fitting 40 and wrapped around the inner circumference of the cap side wall or chamber enclosed by the cap. Alternatively, such as depending on size and configuration of components, the hose can be stored in the cap while either permanently or removably connected to the nozzle.

The hose 60 extends along the inner circumference of the cap to form a circle or ring with the first end 62 disposed toward and/or adjacent the second end 64. The hose 60 is desirably positioned in a single plane generally parallel to the base top 35 and/or cap top 56, with the hose end-to-end or otherwise having adjacent opposing ends generally facing each other. The hose 60 is removably secured in this position, adjacent and/or against the inner surface of the side wall 54 and/or the top 56 by any suitable securing fastener. In the illustrated embodiment, the hose is secured by three spaced apart fasteners 58 integrally formed with and extending from the cap top 56. The fasteners 58 can be clips, tabs, clasps, or other structures that hold the hose against the cap side wall 54 by, for example, deflection forces and/or a snap-hold. The hose, fittings, cap, fasteners, and/or clips, and components thereof, can vary in size, shape, amount, and/or configuration, depending on need.

The dispenser apparatus 20 can be attached to a tire stem valve either by the valve fitting 40 or the hose fitting 70. For example, if a tire stem is in an awkward position, the user can remove the hose 60 from the cap assembly 50, attach the threaded first end 62 to the fitting 40 and attach the second fitting 70 to the tire stem valve. Depressing the nozzle 34 dispenses the can contents through the first fitting 40, into and through the hose 60, and through the second fitting 70 into the tire. The detachable hose of this invention provides flexibility in use and improved storage within the cap assembly.

FIGS. 8-13 show a further embodiment of a dispenser apparatus 120 for placement on a dispensing end of a pressurized can. As above, the dispenser apparatus 120 includes a nozzle assembly 130 with a base 132 and a nozzle 134 with fitting 140 extending from the base and manually depressible to open the dispensing end of the attached can. The dispenser apparatus 120 also includes a cap assembly 150 that fits over the nozzle assembly 130. The cap assembly 150 includes a free length of hose 160 positioned in a ring configuration around an inside of the cap 152.

The embodiment of FIGS. 8-13 further includes an integrated safety lock mechanism 180. The lock mechanism 180 includes a planar slide element disposed at the base 138 of the nozzle 134, and more specifically on and parallel to the top 135 of the base 132, and a push tab element 185 for ease of user operation. The lock 180 is movable between at least two positions, a locking position abutting the nozzle 134, and an unlocked position away from the nozzle 134. The lock 180 can move between the positions by, for example, sliding in a groove in the base 132 or pivoting about a pin in the base 132. The nozzle 134 includes at least one lock element to interact with the lock 180. The nozzle 134 is shown with two lock tabs 182 and 184. When the lock 180 slides between the underside of lock tab 182 and the base 132, the nozzle 134 cannot be activated for dispensing can contents. Sliding the lock 180 into the locked position when the nozzle 134 is depressed can move the lock 180 over the upper surface of the lock tab 182 or 184 to keep the nozzle depressed and open/dispensing without continued manual force. The locking element, tabs, and components thereof, can vary in size, shape, amount, and/or configuration, depending on need. As an example, the nozzle can include one or more inwardly extending grooves to receive the locking element instead of outwardly extending tabs.

Thus the invention provides an improved can topper for a pressurized can. The apparatus provides improved safety and convenience features, while maintaining a compact design.

While in the foregoing specification this invention has been described in relation to certain preferred embodiments thereof, and many details have been set forth for purpose of illustration, it will be apparent to those skilled in the art that the device and placard are susceptible to additional embodiments and that certain of the details described herein can be varied considerably without departing from the basic principles of the invention.

The invention claimed is:

1. An apparatus for dispensing pressurized air and/or tire sealant from a pressurized can, the apparatus comprising:
   a nozzle and a locking element for the nozzle; and
   a base configured to attach to the can, wherein the nozzle extends outward from a top surface of the base and is depressible toward the can to release contents of the pressurized can;
   wherein the locking element comprises a planar slide on and parallel to the top surface of the base, the nozzle comprises an outwardly extending first lock tab and the locking element slides under and/or into contact with the first lock tab to lock the nozzle in a non-dispensing position, and the nozzle comprises an outwardly extending second lock tab disposed on an opposite side of the first lock tab from the base, wherein the locking element slides over and/or into contact with the second lock tab to lock the nozzle in a dispensing position.

2. The apparatus according to claim 1, wherein the nozzle includes a nozzle fitting, and further comprising a cap including a free length of hose that is positioned within the cap and includes a hose fitting, wherein the apparatus is attachable to a stem valve by each and either of the nozzle fitting and the hose fitting.

3. The apparatus according to claim 2, wherein the free length of hose includes a threaded end opposite the hose fitting and configured to attach to the nozzle fitting of the nozzle, and the free length of hose is configured to be stored in a ring configuration around an inside of the cap, wherein in the ring configuration the second end of the hose is adjacent and facing the first end of the hose.

4. The apparatus according to claim 3, wherein the cap includes a cap side wall, a cap top at an end of the cap side wall and partially enclosing a cap chamber, and a fastener within the cap chamber to secure the hose.

5. The apparatus according to claim 4, wherein more than one fastener extends from an inside surface of the cap top to secure the hose against the cap side wall.

6. An apparatus for dispensing pressurized air and/or tire sealant from a pressurized can, the apparatus comprising:
   a base configured to attach to the pressurized can;

a nozzle extending from the base and having an end including a nozzle fitting configured to attach to a stem valve; and a locking element configured to lock the nozzle in a first non-dispensing position and configured to lock the nozzle in a second dispensing position;

wherein the nozzle comprises:

a first lock tab, wherein the locking element is configured to slide under and/or into contact with the first lock tab to lock the nozzle in a non-dispensing position; and a second lock tab disposed on an opposite side of the first lock tab from the base, wherein the locking element is configured to slide over and/or into contact with the second lock tab to lock the nozzle in a dispensing position.

7. The apparatus according to claim 6, wherein each of the first lock tab and the second lock tab outwardly extend from the nozzle.

8. The apparatus according to claim 6, wherein the locking element comprises a planar slide on and parallel to the top surface of the base.

9. The apparatus according to claim 8, wherein the locking element moves between a first, locking position abutting the nozzle and a second, unlocking position away from the nozzle.

10. An apparatus for dispensing pressurized air and/or tire sealant from a pressurized can, the apparatus comprising:

a base configured to attach to the pressurized can;

a nozzle extending from the base and having an end including a threaded nozzle fitting configured to attach to a stem valve;

a cap removably attachable over the base and nozzle, the cap including a cap side wall and a cap top at an end of the cap side wall opposite the base;

a hose having a threaded first end connectable to the threaded nozzle fitting and an opposite second end including a hose fitting configured to attach to the stem valve, wherein the hose is positioned within the cap with the first end detached from the nozzle fitting, wherein the apparatus is attachable to a stem valve by the nozzle fitting both with and without the hose attached; and a locking mechanism adapted to lock the nozzle in at least one of a dispensing position and a non-dispensing position, wherein the locking mechanism comprises a locking element on the base and two locking tabs extending outward from the nozzle, the locking element slides under and/or into contact with a first of the locking tabs to lock the nozzle in a non-dispensing position, the locking element slides over and/or into contact with a second of the locking tabs to lock the nozzle in a dispensing position, and the second of the locking tabs is disposed on an opposite side of the first of the locking tabs from the base.

11. The apparatus according to claim 10, wherein the cap comprises clips or tabs extending from the cap top to secure the hose in a ring position against the cap side wall.

12. An apparatus for dispensing pressurized air and/or tire sealant from a pressurized can, the apparatus comprising:

a base configured to attach to the pressurized can;

a nozzle extending from the base and having an end including a nozzle fitting configured to attach to a stem valve;

a locking element configured to lock the nozzle in a first non-dispensing position and configured to lock the nozzle in a second dispensing position; and a lock component, wherein the locking element is configured to slide under and into contact with the lock component to lock the nozzle in the first non-dispensing position, and wherein the locking element is configured to slide over the lock component when the nozzle is depressed into the base to lock the nozzle in the second dispensing position.

13. The apparatus according to claim 12, wherein the locking element is on the base and the locking component is on the nozzle.

14. The apparatus according to claim 12, further comprising:

a cap removably attached over the base and nozzle, the cap including a cap side wall and a cap top at an end of the cap side wall opposite the base; and a dispensing hose including a first end that is connectable to the nozzle fitting and an opposite second end with a hose fitting configured to attach to the stem valve, wherein the hose is positioned within the cap with the first end detached from the nozzle fitting.

* * * * *